United States Patent
Sinha et al.

(10) Patent No.: US 12,103,674 B2
(45) Date of Patent: *Oct. 1, 2024

(54) SHORT TAKEOFF AND LANDING VEHICLE WITH FORWARD SWEPT WINGS

(71) Applicant: Kitty Hawk Corporation, Palo Alto, CA (US)

(72) Inventors: Pranay Sinha, Sunnyvale, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,502

(22) Filed: Mar. 16, 2023

(65) Prior Publication Data

US 2023/0234704 A1   Jul. 27, 2023

Related U.S. Application Data

(63) Continuation of application No. 17/345,493, filed on Jun. 11, 2021, now Pat. No. 11,634,217, which is a
(Continued)

(51) Int. Cl.
*B64C 13/00*       (2006.01)
*B60L 50/64*       (2019.01)
(Continued)

(52) U.S. Cl.
CPC .......... *B64C 29/0033* (2013.01); *B60L 50/64* (2019.02); *B60L 53/00* (2019.02);
(Continued)

(58) Field of Classification Search
CPC . B64C 29/0033; B64C 29/00; B64C 29/0008; G05D 1/101
See application file for complete search history.

(56) References Cited

U.S. PATENT DOCUMENTS 2,478,847 A   8/1949 Stuart
2,937,823 A   5/1960 Fletcher
(Continued)

FOREIGN PATENT DOCUMENTS

CN   105217026   1/2016
CN   204998771   1/2016
(Continued)

OTHER PUBLICATIONS

Author Unknown, Aerial Ridesharing at Scale, Uber Elevate, Oct. 3, 2019, Retrieved from http://web.archive.org/web/20191003070118/https://www.uber.com/us/en/elevate/uberair/.
(Continued)

*Primary Examiner* — Ian Jen
(74) *Attorney, Agent, or Firm* — Van Pelt, Yi & James LLP

(57) ABSTRACT

A vehicle includes a tilt rotor that is aft of a fixed wing and that is attached to the fixed wing via a pylon. A flight computer configured to instruct the tilt rotor to produce a maximum downward angle including by updating an actuator authority database associated with the flight computer to reflect the maximum downward angle, and generating a rotor control signal for the tilt rotor using the updated actuator authority database that reflects the maximum downward angle, wherein the maximum downward angle is adjustable.

16 Claims, 12 Drawing Sheets

Related U.S. Application Data continuation of application No. 17/066,058, filed on Oct. 8, 2020, now Pat. No. 11,066,162.

(60) Provisional application No. 62/912,872, filed on Oct. 9, 2019.

(51) Int. Cl.

| | |
|---|---|
| *B60L 53/00* | (2019.01) |
| *B64C 13/48* | (2006.01) |
| *B64C 27/82* | (2006.01) |
| *B64C 29/00* | (2006.01) |
| *B64C 39/12* | (2006.01) |
| *B64D 27/02* | (2006.01) |
| *B64D 27/24* | (2006.01) |
| *B64D 27/40* | (2024.01) |
| *B64D 31/06* | (2006.01) |
| *G05D 1/00* | (2006.01) |

(52) U.S. Cl.
CPC .............. *B64C 13/48* (2013.01); *B64C 27/82* (2013.01); *B64C 39/12* (2013.01); *B64D 27/02* (2013.01); *B64D 27/24* (2013.01); *B64D 27/40* (2024.01); *B64D 31/06* (2013.01); *G05D 1/101* (2013.01); *B60L 2200/10* (2013.01); *B64C 2027/8209* (2013.01); *B64D 27/026* (2024.01); *B64D 27/402* (2024.01)

(56) References Cited

U.S. PATENT DOCUMENTS

| | | | |
|---|---|---|---|
| 3,081,964 | A | 3/1963 | Quenzler |
| 3,089,666 | A | 5/1963 | Quenzler |
| 3,159,361 | A | 12/1964 | Weiland |
| 3,179,354 | A | 4/1965 | Alvarez-Calderon |
| 3,273,827 | A | 9/1966 | Girard |
| 4,629,147 | A | 12/1986 | Johnson, Jr. |
| 4,746,081 | A | 5/1988 | Mazzoni |
| 4,828,203 | A | 5/1989 | Clifton |
| RE33,385 | E | 10/1990 | Mazzoni |
| 4,979,698 | A | 12/1990 | Lederman |
| 5,195,702 | A | 3/1993 | Malvestuto, Jr. |
| 5,405,105 | A * | 4/1995 | Kress .................. B64C 29/0033 244/66 |
| 5,454,531 | A | 10/1995 | Melkuti |
| 6,561,456 | B1 | 5/2003 | Devine |
| 8,616,492 | B2 | 12/2013 | Oliver |
| 9,156,549 | B2 | 10/2015 | Vetters |
| 9,694,906 | B1 | 7/2017 | Sadek |
| 9,694,911 | B2 | 7/2017 | Bevirt |
| 10,053,213 | B1 | 8/2018 | Tu |
| 10,144,503 | B1 | 12/2018 | Vander Lind |
| 10,144,509 | B2 | 12/2018 | Cruz Ayoroa |
| 10,479,482 | B1 | 11/2019 | Kuentzel |
| 10,974,827 | B2 | 4/2021 | Bevirt |
| 10,981,648 | B2 | 4/2021 | Sinha |
| 10,988,249 | B1 | 4/2021 | Sinha |
| 2005/0133662 | A1 | 6/2005 | Magre |
| 2011/0155859 | A1 | 6/2011 | Vetters |
| 2011/0168835 | A1 | 7/2011 | Oliver |
| 2012/0091257 | A1 | 4/2012 | Wolff |
| 2014/0158816 | A1 * | 6/2014 | DeLorean .............. B64C 39/12 244/12.4 |
| 2014/0260187 | A1 | 9/2014 | Otto |
| 2015/0266571 | A1 * | 9/2015 | Bevirt ................. B64C 29/0033 244/7 C |
| 2015/0344134 | A1 * | 12/2015 | Cruz Ayoroa ...... B64C 29/0033 244/48 |
| 2016/0101853 | A1 | 4/2016 | Toppenberg |
| 2016/0114887 | A1 * | 4/2016 | Zhou ..................... H04N 23/69 348/148 |
| 2016/0244158 | A1 | 8/2016 | Fredericks |
| 2016/0288903 | A1 | 10/2016 | Rothhaar |
| 2017/0036760 | A1 | 2/2017 | Stan |
| 2017/0203839 | A1 | 7/2017 | Giannini |
| 2018/0079493 | A1 | 3/2018 | Anderson |
| 2018/0086447 | A1 | 3/2018 | Winston |
| 2018/0305005 | A1 | 10/2018 | Parks |
| 2018/0339772 | A1 | 11/2018 | McCullough |
| 2019/0009895 | A1 | 1/2019 | Tu |
| 2019/0127061 | A1 | 5/2019 | McLaren |
| 2019/0256194 | A1 | 8/2019 | Vander Lind |
| 2020/0269975 | A1 | 8/2020 | Fink |
| 2020/0354049 | A1 | 11/2020 | Noppel |
| 2021/0031911 | A1 | 2/2021 | Sinha |
| 2021/0107641 | A1 | 4/2021 | Sinha |

FOREIGN PATENT DOCUMENTS

| | | |
|---|---|---|
| CN | 106828915 | 2/2023 |
| RU | 2577931 | 3/2016 |
| WO | 2015143093 | 9/2015 |

OTHER PUBLICATIONS

Author Unknown, Dornier Do 29, Wikipedia, Feb. 8, 2018, https://en.wikipedia.org/wiki/Dornier_Do_29.

Frederick A. Johnsen, "Nasa Aeronatuics Book Series—Sweeping Forward: Developing & Flight Testing the Gumman X-29A Forward Swept Wing Research Aircraft", 2013.

International Search Report and Written Opinion for Application No. PCT/US2018/062855, Completed Jan. 11, 2019 and mailed Jan. 16, 2019.

Mark Moore, Vehicle Collaboration Strategy and Common Reference Models, Uber Elevate Transformative VTOL Workshop, Jan. 2018.

Wing Configuration with forward sweeping (Captured Feb. 18, 2019).

* cited by examiner

SHORT TAKEOFF AND LANDING VEHICLE WITH FORWARD SWEPT WINGS

CROSS REFERENCE TO OTHER APPLICATIONS

This application is a continuation of U.S. patent application Ser. No. 17/345,493 entitled SHORT TAKEOFF AND LANDING VEHICLE WITH FORWARD SWEPT WINGS filed Jun. 11, 2021, now U.S. Pat. No. 11,634,217, which is incorporated herein by reference for all purposes, which is a continuation of U.S. patent application Ser. No. 17/066,058 entitled SHORT TAKEOFF AND LANDING VEHICLE WITH FORWARD SWEPT WINGS filed Oct. 8, 2020, now U.S. Pat. No. 11,066,162, which is incorporated herein by reference for all purposes, which claims priority to U.S. Provisional Patent Application No. 62/912,872 entitled FIXED WING AIRCRAFT WITH TILT ROTORS filed Oct. 9, 2019 which is incorporated herein by reference for all purposes.

BACKGROUND OF THE INVENTION

New types of aircraft are being developed which are capable of taking off and landing in dense urban areas, opening up new transportation pathways and bypassing gridlock on the roads. For example, Kitty Hawk Corporation is developing a new electric vertical takeoff and landing (eVTOL) tiltrotor which can take off and land in a footprint of roughly 30 ft.×30 ft. An early prototype has been manufactured and tested and further improvements to the vehicle's performance (e.g., improving the range) would be desirable.

BRIEF DESCRIPTION OF THE DRAWINGS

Various embodiments of the invention are disclosed in the following detailed description and the accompanying drawings.

FIG. 2B is a diagram illustrating a bottom view of an embodiment of boundary layer thicknesses with motors on.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a short takeoff and landing (STOL) vehicle are described herein. In some embodiments, vehicle includes a tail having a surface and a fuselage having a surface, where the tail and the fuselage have a continuity of surfaces where the surface of the tail directly coupled to the surface of the fuselage. This embodiment of the vehicle further includes a forward-swept wing having a trailing edge and a rotor that is attached to the trailing edge of the forward-swept wing via a pylon, where the rotor has a maximum downward angle from horizontal that is less than or equal to 60° and the STOL vehicle takes off and lands using at least some lift from the forward-swept wing and at least some lift from the rotor.

It may be helpful to first describe an early prototype of the tiltrotor vehicle, where the tilt rotors have a range of (substantially) 0°-90°. Then, various embodiments of the STOL vehicle are described.

Figure 1A:
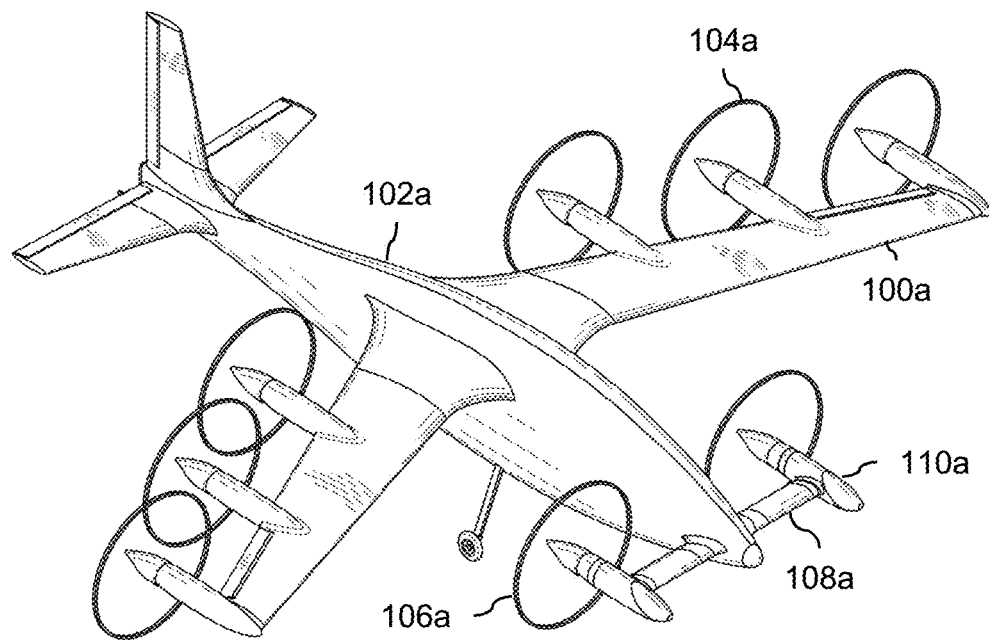
FIG. 1A is a perspective view diagram illustrating an embodiment of a forward swept, fixed wing vehicle with tilt rotors.
Figure 1B:
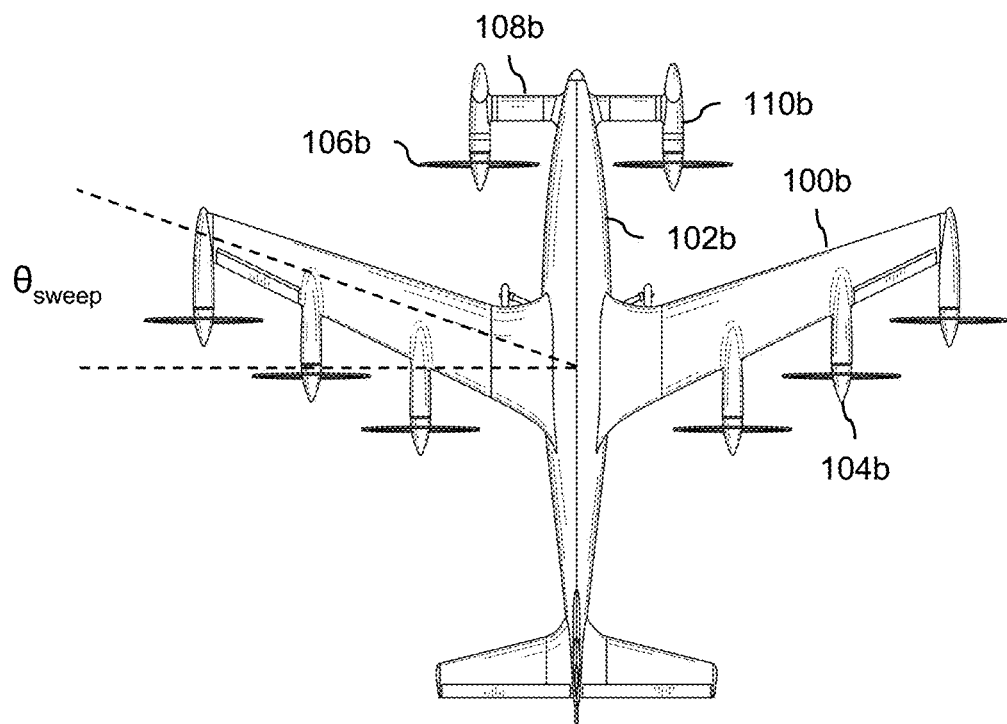
FIG. 1B is a top view diagram illustrating an embodiment of a forward swept, fixed wing vehicle with tilt rotors.

FIG. 1A is a perspective view diagram illustrating an embodiment of a forward swept, fixed wing vehicle with tilt rotors. FIG. 1B is a top view diagram illustrating an embodiment of a forward swept, fixed wing vehicle with tilt rotors. In the example shown, the main wing (100a and 100b) is a fixed wing which is attached to the fuselage (102a and 102b) in a fixed manner or position. The main wing is not, in other words, a tilt wing which is capable of rotating. The main wing (100a and 100b) is also forward swept (e.g., relative to the pitch axis). For example, the forward-sweep angle may be on the order of $\theta_{sweep}$ between 14° and 16° for aircraft embodiments with a canard (as shown here) or as high as 35° for aircraft embodiments without a canard.

In this example, the main wing (100a and 100b) has six rotors (104a and 104b) which are attached to the trailing edge of the main wing. Rotors or propellers in this configuration are sometimes referred to as pusher propellers (e.g., because the propellers are behind the wing and "push" the vehicle forward, at least when they are in their forward flight position). Forward flight mode is sometimes referred to herein as cruise mode. For clarity, these rotors on the main wing are sometimes referred to as the main wing rotors (e.g., to differentiate them from the rotors which are attached to the canard). Naturally, the number of rotors shown here is merely exemplary and is not intended to be limiting.

In addition to the six main wing rotors, there are two rotors (106a and 106b) which are attached to the canard (108a and 108b). These rotors are sometimes referred to as the canard rotors. The canard is thinner than the main wing, so unlike the main wing rotors, the canard rotors are attached to the distal ends of the canard as opposed to the trailing edge of the canard.

All of the rotors in this example are tilt rotors, meaning that they are capable of tilting or otherwise rotating between two positions. In the drawings shown here, the rotors are in a cruise (e.g., forward flight, backward facing, etc.) position. In this position, the rotors are rotating about the (e.g., substantially) longitudinal axes of rotation so that they provide (substantially) backward thrust. When the rotors are in this position, the lift to keep the tiltrotor vehicle airborne comes from the airflow over the main wing (100a and 100b) and the canard (108a and 108b). In this particular example, the rotational range of a tilt rotor ranges has a minimum angular position of approximately 0°-5° and a maximum angular position of approximately 90°-95°. This range is design and/or implementation specific.

The rotors can also be tilted down to be in a hover (e.g., vertical takeoff and landing, downward facing, etc.) position (not shown). In this second position, the rotors are rotating about (e.g., substantially) vertical axes of rotation so that they provide (substantially) downward thrust. In this configuration, the lift to keep the tiltrotor vehicle airborne comes from the downward airflow of the rotors.

Generally speaking, the tilt rotors, when oriented to output thrust substantially downward, permit the aircraft to perform vertical takeoff and landings (VTOL). This mode or configuration (e.g., with respect to the manner in which the aircraft as a whole is flown and/or with respect to the position of the tilt rotors specifically) is sometimes referred to as hovering. The ability to perform vertical takeoffs and landings permits the aircraft to take off and land in areas where there are no airports and/or runways. Once airborne, the tilt rotors (if desired) change position to output thrust (substantially) backwards instead of downwards. This permits the aircraft to fly in a manner that is more efficient for forward flight; this mode or configuration is sometimes referred to as cruising.

A canard is useful because it can stall first (e.g., before the main wing), creating a lot of pitching moments and not much loss of lift at stall whereas a main wing stall loses a lot of lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provides a strut to hold or otherwise attach the canard motors to.

In some embodiments, the pylons (110a and 110b) which are used to attach the rotors to the canard and/or main wing include some hinge and/or rotating mechanism so that the tilt rotors can rotate between the two positions shown. Any appropriate hinge mechanism may be used. For example, with ultralight aircraft, there are very stringent weight requirements and so a lightweight solution may be desirable. Alternatively, a fixed-tilt solution may also be used to meet very stringent weight requirements.

In some embodiments, the aircraft is designed so that the main wing (100a and 100b) and canard (108a and 108b) are able to provide sufficient lift to perform a glider-like landing if needed during an emergency. For example, some ultralight standards or specifications require the ability to land safely if one or more rotors fail and the ability to perform a glider-like landing would satisfy that requirement. One benefit to using a fixed wing for the main wing (e.g., as opposed to a tilt wing) is that there is no danger of the wing being stuck in the wrong position (e.g., a hover position) where a glider-like landing is not possible because of the wing position which is unsuitable for a glider-like landing.

Another benefit to a fixed wing with trailing edge mounted tilt rotors is stall behavior (or lack thereof) during a transition from hover position to cruise position or vice versa. With a tilt wing, during transition, the tilt wing's angle of attack changes which makes stalling an increased risk. A fixed wing with trailing edge mounted tilt rotors does not change the wing angle of attack (e.g., even if rotors are turned off/on or the tilt rotors are shifted). Also, this configuration both adds dynamic pressure and circulation over the main wing, which substantially improves the behavior during a transition (e.g., from hover position to cruise position or vice versa). In other words, the transition can be performed faster and/or more efficiently with a fixed wing with trailing edge mounted tilt rotors compared to a tilt wing (as an example).

Another benefit associated with fixed wing vehicle with tilt rotors (e.g., as opposed to a tilt wing) is that a smaller mass fraction is used for the tilt actuator(s). That is, multiple actuators for multiple tilt rotors (still) comprise a smaller mass fraction than a single, heavy actuator for a tilt wing. There are also fewer points of failure with tilt rotors since there are multiple actuators as opposed to a single (and heavy) actuator for the tilt wing. Another benefit is that a fixed wing makes the transition (e.g., between a cruising mode or position and a hovering mode or position) more stable and/or faster compared to a tilt wing design.

In some embodiments, the rotors are variable pitch propellers which have different blade pitches when the rotors are in the hovering position versus the cruising position. For example, different (ranges of) blade pitches may enable more efficient operation or flight when in the cruise position versus the hovering position. When the rotors are in a cruise position, putting the blade pitches into "cruising pitch" (e.g., on the order of 26°) enables low frontal area which is good for cruising (e.g., lower drag). When the rotors are in a hovering position, putting the blade pitches into a "hovering pitch" (e.g., on the order of 6°) enables high disc area which is good for hovering. To put it another way, one blade pitch may be well suited for cruising mode but not for hovering mode and vice versa. The use of variable pitch propellers enables better (e.g., overall) efficiency, resulting in less power consumption and/or increased flight range.

The following figures illustrate various benefits associated with the exemplary aircraft shown in FIGS. 1A and 1B.

Figure 2B:
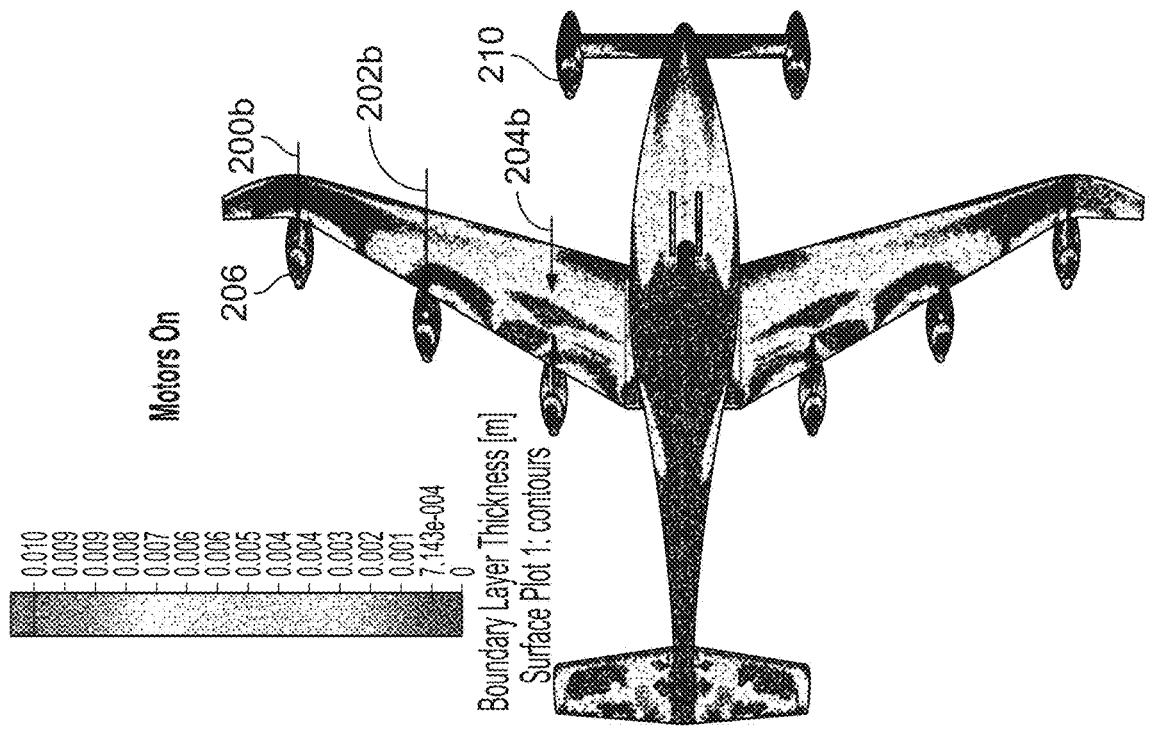
Figure 2A:
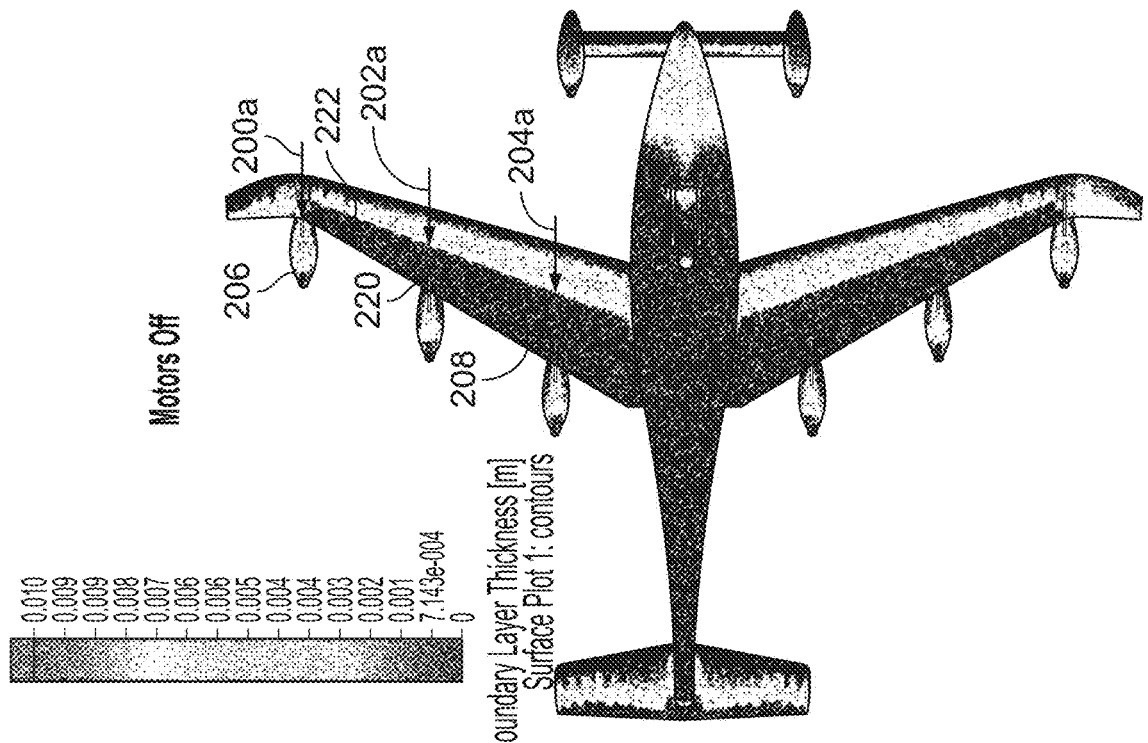
FIG. 2A is a diagram illustrating a bottom view of an embodiment of boundary layer thicknesses with the motors off.

FIG. 2A is a diagram illustrating a bottom view of an embodiment of boundary layer thicknesses with the motors off. In this example, laminar run lines 200a, 202a, and 204a illustrate laminar runs at various regions of the main wing. In this example, it is assumed that the aircraft is cruising (e.g., flying in a substantially forward direction). As in FIGS. 1A and 1B, the main wing rotors (206) are attached to the trailing edge of the main wing (208) in this embodiment. The next figure shows the boundary layer thicknesses with the rotors turned on.

FIG. 2B is a diagram illustrating a bottom view of an embodiment of boundary layer thicknesses with motors on. In this example, the motors are on and the rotors have an exit airflow velocity of 30 m/s. With the motors on, a low pressure region is created towards the aft of the wing which increases the laminar run on the main wing. See, for example, laminar run lines 200b, 202b, and 204b which correspond to laminar run lines 200a, 202a, and 204a from FIG. 2A. A comparison of the two sets illustrates that the laminar runs have increased for the first two locations (i.e., at 200a/200b and 202a/202b). The last location (i.e., 204a/204b) has only a slightly longer laminar run length due to interference from the canard rotors (210).

The drag from the main wing rotors (more specifically, the drag from the pylons which are used to attach the main wing rotors to the main wing) is hidden in the wake of the airflow coming off the main wing. See, for example FIG. 2A which more clearly shows that the pylons (220) are connected or otherwise attached behind most of the extent of laminar run (222). With the embodiment shown here, the pylons also get to keep some of the boundary layer thickness from the main wing, which means the pylons have lower drag per surface area. This improves the drag compared to some other alternate designs or configurations. The following figures describe this in more detail.

Figure 3A:
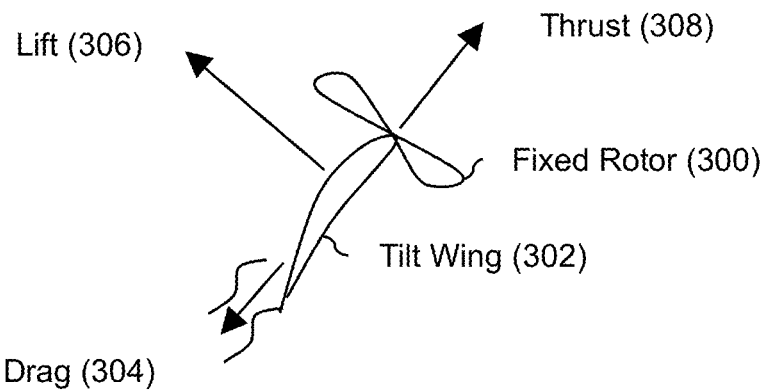
FIG. 3A is a diagram illustrating an example of a tilt wing configuration with corresponding lift vector, thrust vector, and drag.

FIG. 3A is a diagram illustrating an example of a tilt wing configuration with corresponding lift vector, thrust vector, and drag. In this example, a fixed rotor (300) is attached to a tilt wing (302) at a fixed position or angle. This is one alternate arrangement to the aircraft embodiment(s) described above. To direct the airflow produced by the fixed rotor (300) either backwards or downwards, the tilt wing (302) is rotated. As shown here, with this configuration, there is drag (304) at the trailing edge of the tilt wing, which is undesirable.

The lift (306) and thrust (308) for this configuration are also shown here, where the tilt wing is shown in the middle of a transition (e.g., between a cruising position and a hovering position). As shown here, the lift (306) and thrust (308) are substantially orthogonal to each other, which is inefficient. In other words, a tilt wing is inefficient during its transition.

Figure 3B:
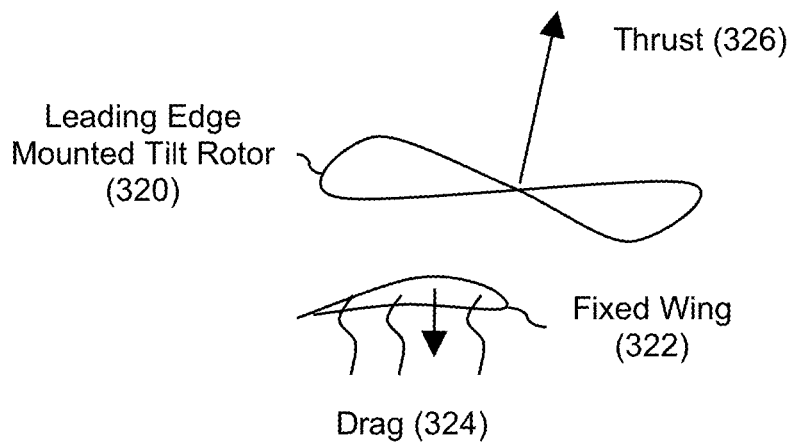
FIG. 3B is a diagram illustrating an example of a fixed wing configuration with a leading edge mounted tilt rotor and corresponding lift vector, thrust vector, and drag.

FIG. 3B is a diagram illustrating an example of a fixed wing configuration with a leading edge mounted tilt rotor and corresponding lift vector, thrust vector, and drag. In this example, a tilt rotor (320) is attached to the leading edge of a fixed wing (322). This is another alternate arrangement to the aircraft embodiment(s) described above. The corresponding drag (324) and thrust (326) for this arrangement are also shown. There is no useful lift produced with this configuration and therefore no lift vector is shown here.

Figure 3C:
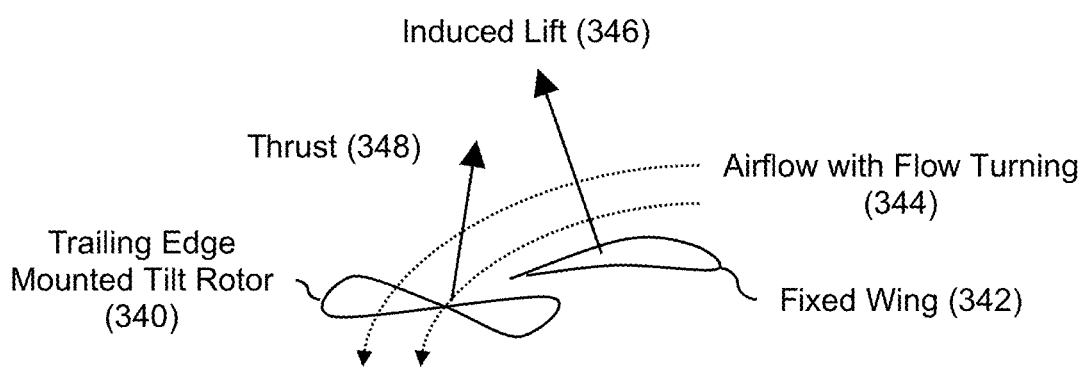
FIG. 3C is a diagram illustrating an embodiment of a fixed wing configuration with a trailing edge mounted tilt rotor and corresponding lift vector, thrust vector, and drag.

FIG. 3C is a diagram illustrating an embodiment of a fixed wing configuration with a trailing edge mounted tilt rotor and corresponding lift vector, thrust vector, and drag. In this example, the tilt rotor (340) is attached to the trailing edge of the fixed wing (342). In this configuration, the drag due to the trailing edge mounted tilt rotor (e.g., mostly due to its pylon, not shown) is hidden in the wake of the airflow coming off the main wing. As such, there is no drag (at least due to the tilt rotor (340)).

The position of the trailing edge mounted tilt rotor (340) relative to the fixed wing (342) also sucks air (344) over the fixed wing, after which the air turns or bends through the rotor and downwards. This flow turning over the wing generates a relatively large induced lift (346) which is shown here. The thrust vector (348) due to the rotors is also shown here. It is noted that the induced lift (346) and thrust (348) are substantially in the same direction (i.e., both are pointing substantially upwards) which is a more efficient arrangement, including during a transition. In other words, using a fixed wing with trailing edge mounted tilt rotors produces less drag and improved efficiency during a transition (e.g., due to the lift and thrust vectors which now point in substantially the same direction) compared to other rotor and wing arrangements. Note for example, drag 304 and drag 324 in FIG. 3A and FIG. 3B, respectively, and the orthogonal positions of lift 306 and thrust 308 in FIG. 3A.

The following figure illustrates an embodiment of flow turning in more detail.

Figure 4:
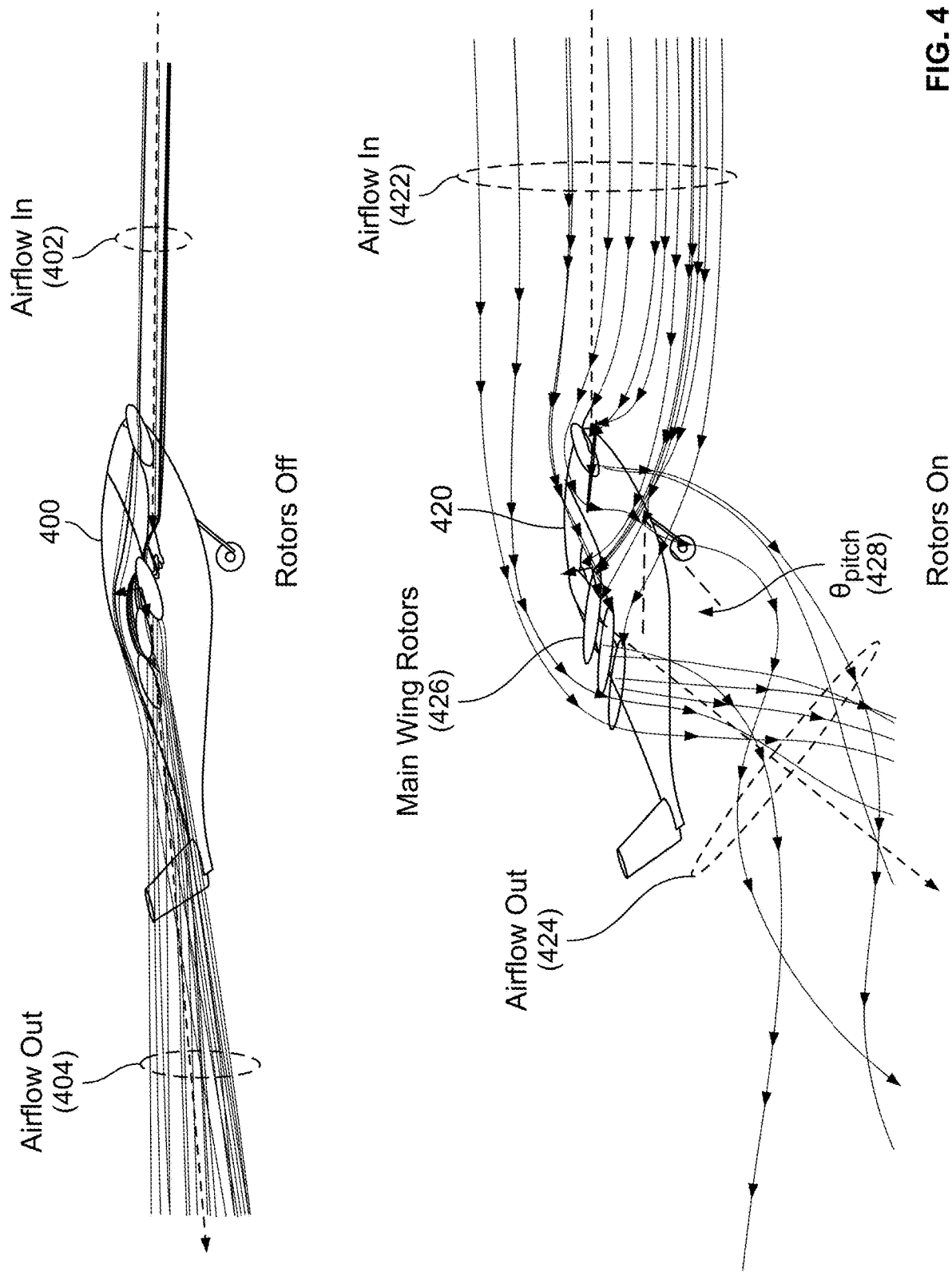
FIG. 4 is a diagram illustrating an embodiment of airflow produced when trailing edge mounted tilt rotors on a main wing are off.

FIG. 4 is a diagram illustrating an embodiment of airflow produced when trailing edge mounted tilt rotors on a main wing are off. In this example, a tiltrotor (400) is shown but with the main wing rotors turned off for comparison purposes. With the rotors off, the airflow in (402) and the airflow out (404) are moving in substantially the same direction. That is, the airflow does not turn (e.g., downwards) as it passes through the rotors.

Tiltrotor 420 shows the same vehicle as tiltrotor 400 except the rotors are turned on. In this example, the airflow in (422) and the airflow out (424) have noticeable different directions and there is noticeable turning or bending of the airflow as it passes through the rotors of the exemplary tiltrotor shown. As described above, this induces a noticeable lift, which is desirable because less power is consumed and/or the range of the tiltrotor increases.

In this example, the main wing rotors (426) are in the hovering position. As shown here, these rotors are slightly pitched or otherwise angled (e.g., with the tops of the main wing rotors pointing slightly forward and the bottoms pointing slightly backward). In this diagram, the amount of tilting is shown as $\theta_{pitch}$ (428) and in some embodiments is on the order of 90° of rotational range or movement (e.g., ~ 3° up from horizontal when in a cruise position (e.g., for minimum drag) and ~ 93° degrees down from horizontal when in a hover position which produces a rotational range of)~96°. Although this angling or pitching of the rotors is not absolutely necessary for flow turning to occur, in some embodiments the main wing rotors are angled or otherwise pitched to some degree in order to increase or otherwise optimize the amount of flow turning. In some embodiments, the canard rotors are similarly pitched. It is noted that tiltrotor 420 is shown in a nose up position and therefore the vertical axis (e.g., relative to the tiltrotor) is not perpendicular to the ground and/or frame of reference.

In some embodiments, the rotors (e.g., the main wing rotors and/or canard rotors) are rolled or otherwise angled slightly outward, away from the fuselage, when the rotors are in hovering position. In some embodiments, this roll (e.g., outward) is on the order of 10° for greater yaw authority.

In some embodiments, the main wing is tapered (e.g., the wing narrows going outward towards the tip) in addition to being forward swept. The following figures describe various wing and/or tail embodiments.

Figure 5:
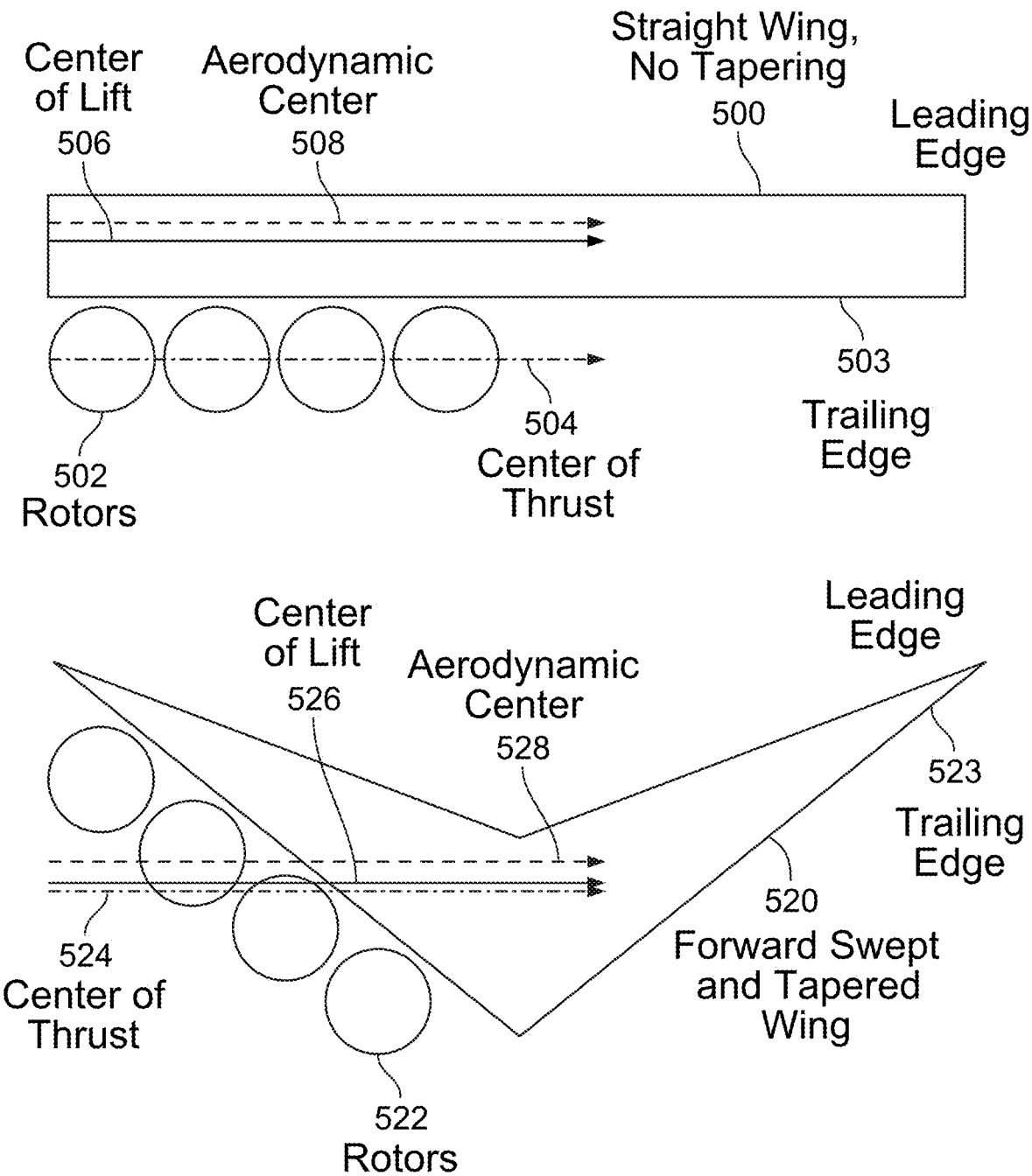
FIG. 5 is a diagram illustrating an embodiment of a forward swept and tapered wing and a straight wing for comparison.

FIG. 5 is a diagram illustrating an embodiment of a forward swept and tapered wing and a straight wing for comparison. In the example shown, wing 500 is a straight wing with no tapering (e.g., the wing is the same width from the center to the tip of the wing). Exemplary rotors (502) are shown at the trailing edge of the straight wing (500).

The center of thrust (504), indicated by a dashed and dotted line, is dictated by the placement or arrangement of the rotors and runs through the centers of the main wing rotors (502). For simplicity, the canard rotors are ignored in this example. The center of lift is based on the shape of the wing. For a rectangular wing such as wing 500, the center of lift (506), indicated by a solid line, runs down the center of the wing. Calculation of the aerodynamic center is more complicated (e.g., the aerodynamic center depends upon the cross section of the wing, etc.) and aerodynamic center 508, indicated by a dashed line, is exemplary and/or typical for this type of wing.

As shown here, the straight wing (500) and its corresponding arrangement of main wing rotors (502) produce a center of thrust (504) which is relatively far from both the center of lift (506) as well as the aerodynamic center. This separation is undesirable. More specifically, when the main wing rotors (502) are in hover position, if the center of thrust (504) is far from the center of lift (506), then the transition (e.g., in the context of the movement of the aircraft as a whole, such as switching from flying substantially upwards to substantially forwards or vice versa) would create very large moments and could overturn the vehicle or prevent acceleration or stability and/or require a massive and/or non-optimal propulsion system. In cruise, if the center of thrust (504) is far from the center of lift (506), it is not as important (e.g., since the thrust moments are both smaller and more easily balanced by aerodynamic moments), but it is still undesirable.

In contrast, the forward swept and tapered wing (520) and its corresponding arrangement of rotors (522) along the trailing edge produce a center of thrust (524), center of lift (526), and aerodynamic center (528) which are closer to each other. For example, the forward sweep of the wing brings the rotors forward to varying degrees. This causes the center of thrust to move forward (e.g., towards the leading edge and towards the other centers). The tapering of the wings prevents the aerodynamic center and center of lift from creeping forward too much (and more importantly, away from the center of thrust) as a result of the forward sweep. For example, with a forward swept wing with no tapering (not shown), the center of thrust would move forward approximately the same amount as the aerodynamic center and center of lift and would result in more separation between the three centers than is shown here with wing 520.

Some other benefits to a forward swept and tapered wing include better pilot visibility, and a better fuselage junction location with the main wing (e.g., so that the main wing spar can pass behind the pilot seat, not through the pilot). Furthermore, the taper reduces wing moments and puts the center of the thrust of the motors closer to the wing attachment to the fuselage, as referenced about the direction of flight, so there are less moments carried from wing to fuselage, a shorter tail boom (e.g., which reduces the weight of the aircraft), and improved pitch stability.

The following figures describe exemplary tilt transitions of the rotors between cruise position and hover position.

Figure 6A:
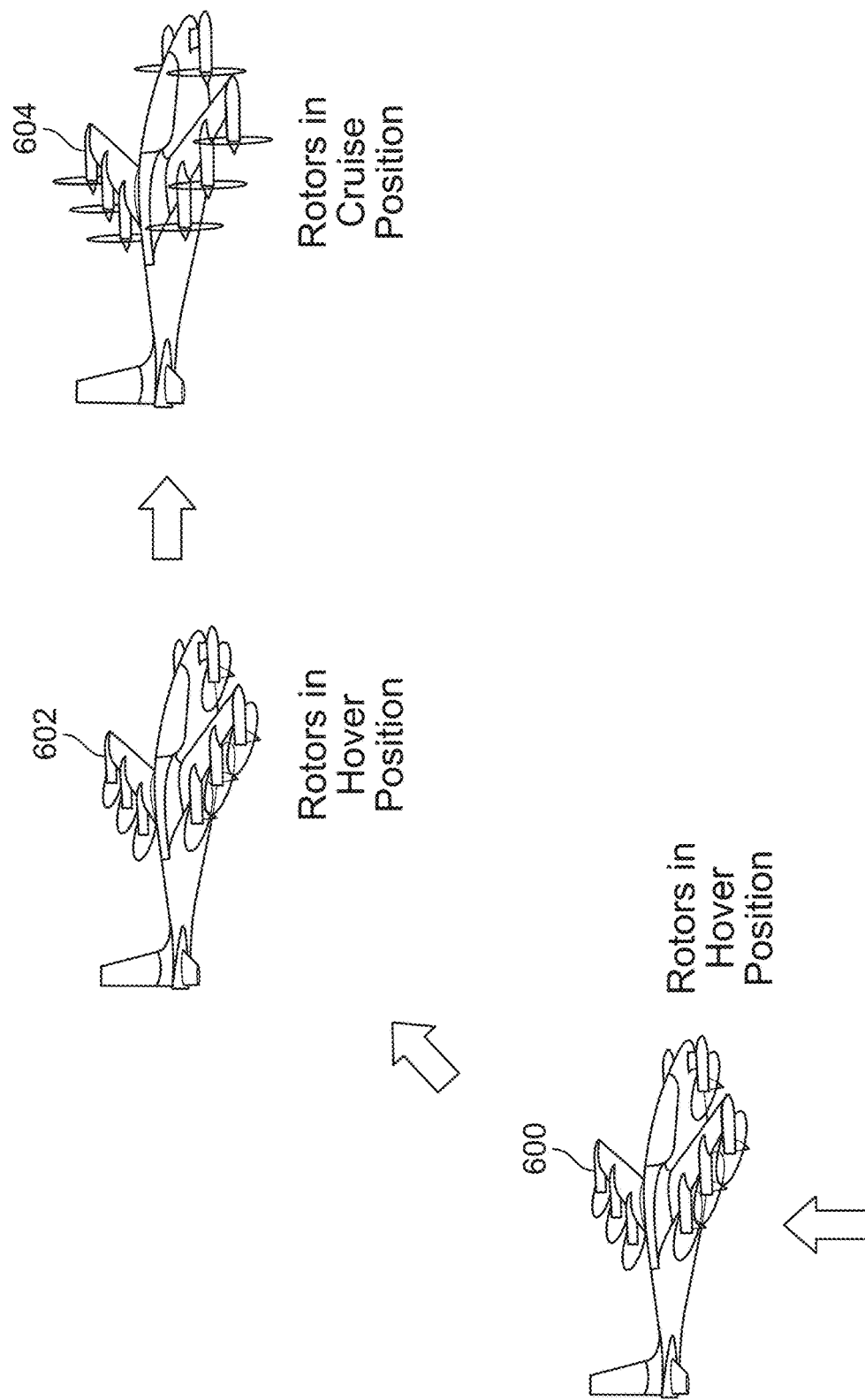
FIG. 6A is a diagram illustrating an embodiment of a takeoff tilt change from hover position to cruise position.

FIG. 6A is a diagram illustrating an embodiment of a takeoff tilt change from hover position to cruise position. In some embodiments, the exemplary tiltrotor performs this transition soon after taking off (e.g., substantially vertically). It is noted that this tilt transition is optional and the aircraft may fly entirely with the rotors in the hovering position (albeit with less than optimal performance). For example, this could be done if there is risk in the tilting action, and it would be better to take the action at a higher altitude.

Tiltrotor 600 shows the exemplary aircraft after it has performed a vertical takeoff. In this state shown here, the main wing rotors and canard rotors are in hover position (e.g., rotating about a substantially vertical axis of rotation so that the rotors generate substantially downward thrust).

The tiltrotor then transitions from an entirely upward direction of movement to a direction of movement with at least some forward motion with the rotors remaining in the hover position until the tiltrotor reaches some desired altitude at which to begin the transition (602). In other words, the vehicle transitions first, and then changes the tilt of the rotors. In one example, the altitude at which the tiltrotor begins the rotor tilt change from hover position to cruise position is an altitude which is sufficiently high enough for there to be recovery time in case something goes wrong during the transition. Switching the rotors between hover position and cruise position is a riskier time where the likelihood of something going wrong (e.g., a rotor failing, a rotor getting stuck, etc.) is higher. Although the tiltrotor may have systems and/or techniques in place for recovery (e.g., compensating for a rotor being out by having the remaining rotors output more thrust, deploy a parachute, etc.), these systems and/or techniques take time (i.e., sufficient altitude) to work.

From position 602, the tiltrotor flies substantially forward and moves the tilt rotors from a hover position (e.g., where thrust is output substantially downward) to a cruise position. Once in the cruise position 604, the rotors rotate about a substantially longitudinal axis so that they output backward thrust.

Figure 6B:
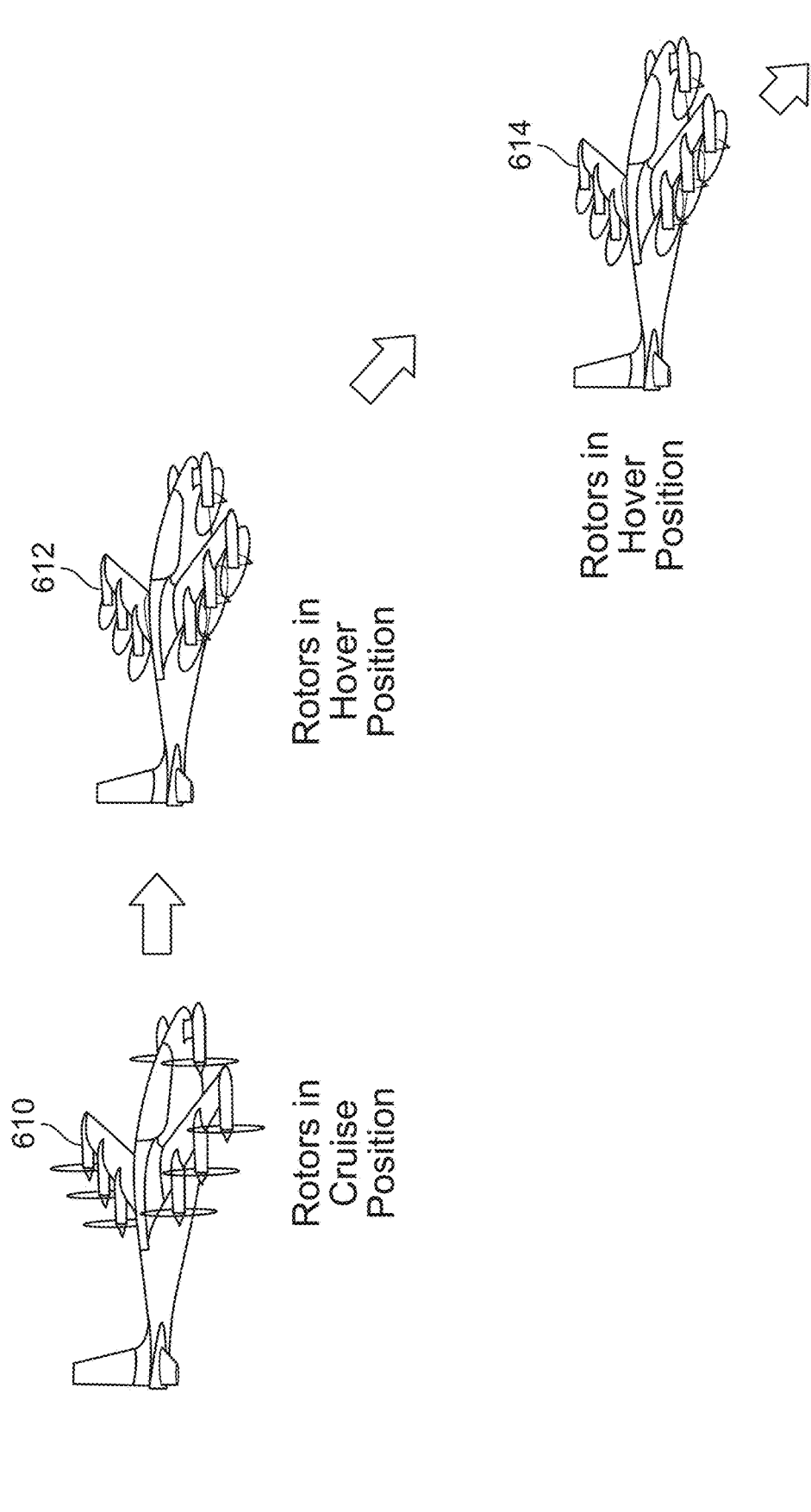
FIG. 6B is a diagram illustrating an embodiment of a landing tilt change from cruise position to hover position.

FIG. 6B is a diagram illustrating an embodiment of a landing tilt change from cruise position to hover position. For example, the exemplary tiltrotor may perform this transition before landing vertically. As with the previous transition, this transition is optional. For example, the exemplary tiltrotor can keep the tilt rotors in cruise position and perform a glider-like landing as opposed to a vertical landing if desired.

Tiltrotor 610 shows the rotors in a cruise position. While flying in a substantially forward direction, the tilt rotors are moved from the cruise position shown at 610 to the hover position shown at 612. With the tilt rotors in the hover position (612), the tiltrotor descends with some forward movement (at least in this example) so as to keep power use low(er) and retain better options in the case of a failure of a motor or other component (e.g., the tiltrotor can power up the rotors and pull out of the landing process or path) to position 614 until it finally lands on the ground.

Figure 7:
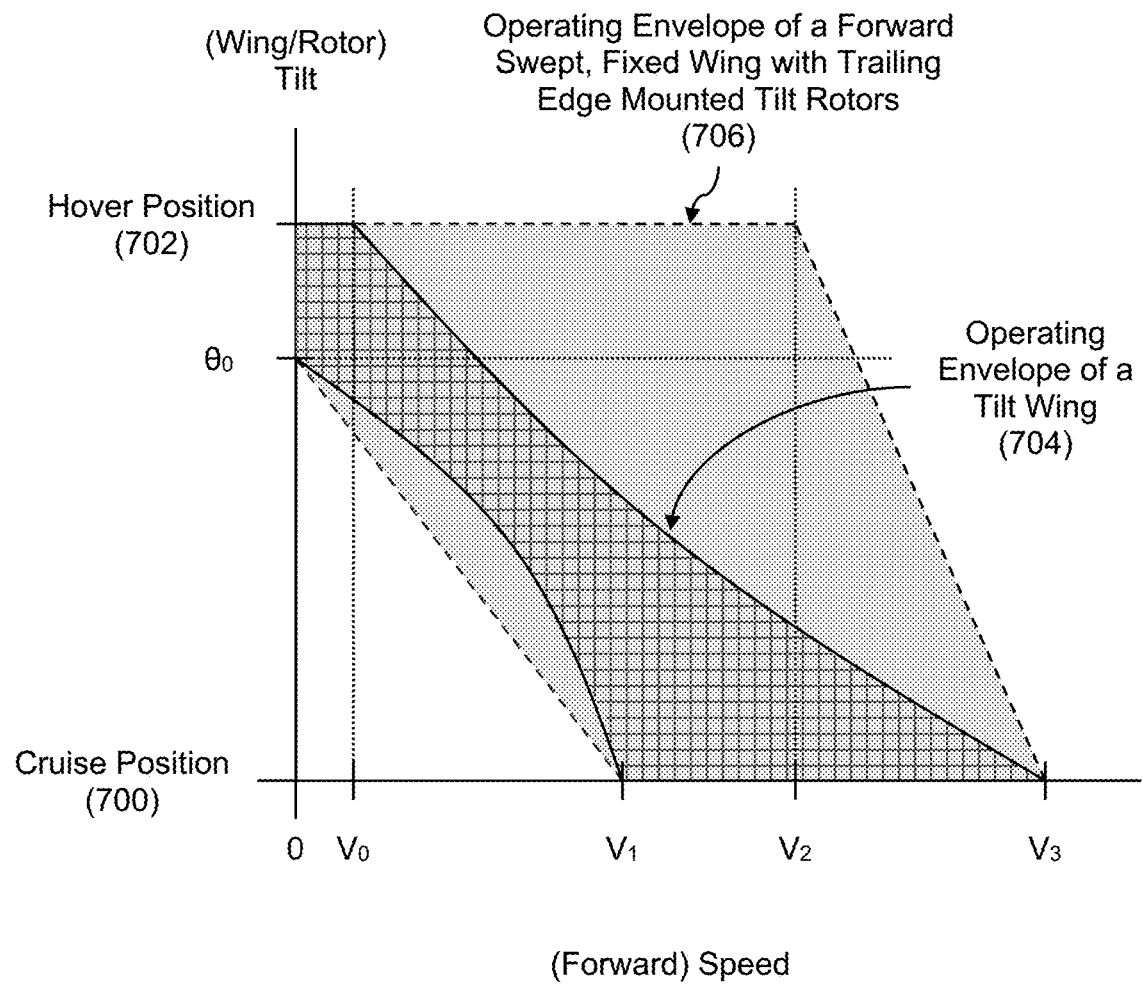
FIG. 7 is a diagram illustrating an embodiment of a velocity tilt diagram.

FIG. 7 is a diagram illustrating an embodiment of a velocity tilt diagram. In the diagram shown, the x-axis shows the forward speed of the aircraft and the y-axis shows the tilt (e.g., position or angle of the tilt wing or tilt rotors) which ranges from a (e.g., minimal) cruise position (700) to a (e.g., maximal) hover position (702).

The first operating envelope (704), shown with a solid border and filled with a grid pattern, is associated with a tilt wing aircraft. See, for example, tiltrotor 400 in FIG. 4 and tilt wing 302 and fixed rotor 300 in FIG. 3A. The second operating envelope (706), shown with a dashed border and gray fill, is associated with an (e.g., comparable) aircraft with a forward swept and fixed wing with trailing edge mounted tilt rotors. See, for example, the embodiments described above.

In the diagram shown here, the tilt rotor operating envelope (706) is a superset of the tilt wing operating envelope (704) which indicates that the former aircraft configuration is safer and/or more airworthy than the latter and is also able to fly both faster and slower at comparable tilt positions. With a fixed wing, the wing is already (and/or always) pointed in the direction of (forward) travel. When the tilt rotors are at or near the (e.g., maximal) hover position (702), the vehicle can fly pretty much all the way up to the stall speed (e.g., $V_2$) without having to tilt the motors up to cruise position. Note, for example, that the tilt rotor operating envelope (706) can stay at the (e.g., maximal) hover position (702) all the way up to $V_2$. This greatly increases the operating regime of the tilt rotor operating envelope (706) compared to the tilt wing operating envelope (704). Note for example, all of the gray area above the tilt wing operating envelope (704).

Another effect which can contribute to the expanded operating envelope for the tilt rotor configuration at or near hover position includes flow turning (see, e.g., FIG. 4). The flow turning over the main wing induces some extra lift. In some embodiments, this flow turning and its resulting lift are amplified or optimized by tilting the main wing rotors at a slight backward angle from directly down when in a normal hover (e.g., at minimal tilt position 700).

In contrast, a tilt wing presents a large frontal area when the tilt wing is tilted up in (e.g., maximal) hover position (702). As a result, tilt wings are unable to fly forward at any kind of decent speed until at or near the full (e.g., minimal) cruise position (700) or nearly so.

The example vehicle described above is designed for vertical takeoffs and landing. However, taking off and landing vertically (i.e., hover mode) is very power hungry mode of a flight. By modifying the VTOL vehicle to instead perform short takeoffs and landings (STOL), the range of the vehicle may be increased. To adapt the vehicle for STOL operation, the range of the tilt rotors is restricted to angle(s) meaningfully less than the 90° associated with hovering. The following figures describe various embodiments of this.

Figure 8:
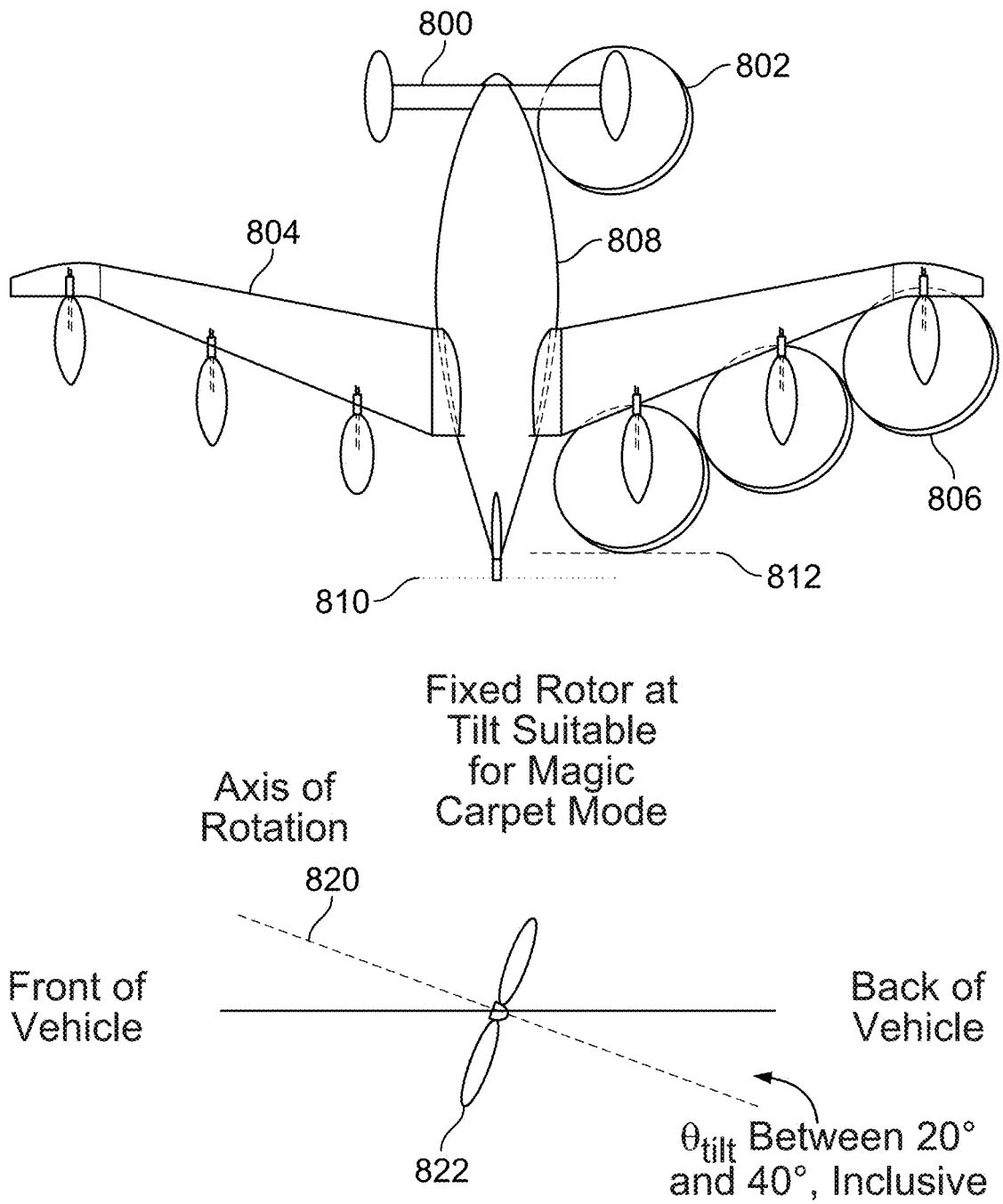
FIG. 8 is a diagram illustrating an embodiment of a vehicle with a truncated fuselage which is capable of flying in a magic carpet mode.

FIG. 8 is a diagram illustrating an embodiment of a vehicle with a truncated fuselage which is capable of flying in a magic carpet mode. As used herein, the term magic carpet mode refers to a mode in which the rotors are still in a hovering orientation, but the vehicle has been accelerated to an airspeed where a substantial amount of lift is generated by the wing. In the magic carpet mode, the vehicle speed can be controlled with forward pitch, and altitude can be controlled either by increasing speed to gain efficiency and thus climb rate, or by directly adding thrust to the rotors. In the example shown, the vehicle has a canard (800) with two canard rotors (802), only one of which is shown. The main wing (804), which is a fixed wing with a forward sweep, has six main wing rotors (806), only half of which are shown, which are attached to the trailing edge of the main wing. The fuselage (808) is relatively short and is referred to herein as a truncated fuselage. For example, note that the end of the fuselage (810) extends only a little bit past the end of the backmost rotor (812). In this particular embodiment, the rotors are fixed and do not tilt or otherwise change position.

There are a variety of vehicle embodiments which are capable of meeting stringent weight requirements (e.g., an ultralight standard). In this approach, the truncated fuselage is much shorter and there is no tail per se, both of which keep the weight down. The use of fixed rotors (e.g., as opposed to tilt rotors) also keeps the weight down. The truncated fuselage and lack of a tail also produces a smaller footprint which helps with transport (e.g., in a trailer) and the amount of space required for takeoff and/or landing.

In some embodiments, the rotors at a fixed position tilted back, more on the hover end of the tilt spectrum as opposed to the cruise end of the tilt spectrum (e.g., an axis of rotation that is tilted downward from horizontal at an angle between 20° to 40°, inclusive). See, for example the axis of rotation (820) associated with fixed rotor (822) where the tilt angle is between 20° to 40° which suitable and/or acceptable for magic carpet mode. For example, this rotor position (although fixed) permits the exemplary vehicle to fly vertically (e.g., not due to aerodynamic lift on the wing, but from the airflow produced by the rotors) as well as forwards (e.g., off the wing). This ability or mode of keeping the rotors in a hover-style tilt while flying (e.g., primarily and/or mostly) in a wing borne manner is sometimes referred to as a fly magic carpet mode. It is noted that this ability to fly in a magic carpet mode is not necessarily limited to fixed rotor embodiments. For example, some or all of the above tilt rotor embodiments may be flown in magic carpet mode (e.g., where the tilt position is the extreme or maximal hover position, or some tilt position between the two extremes).

Figure 9A:
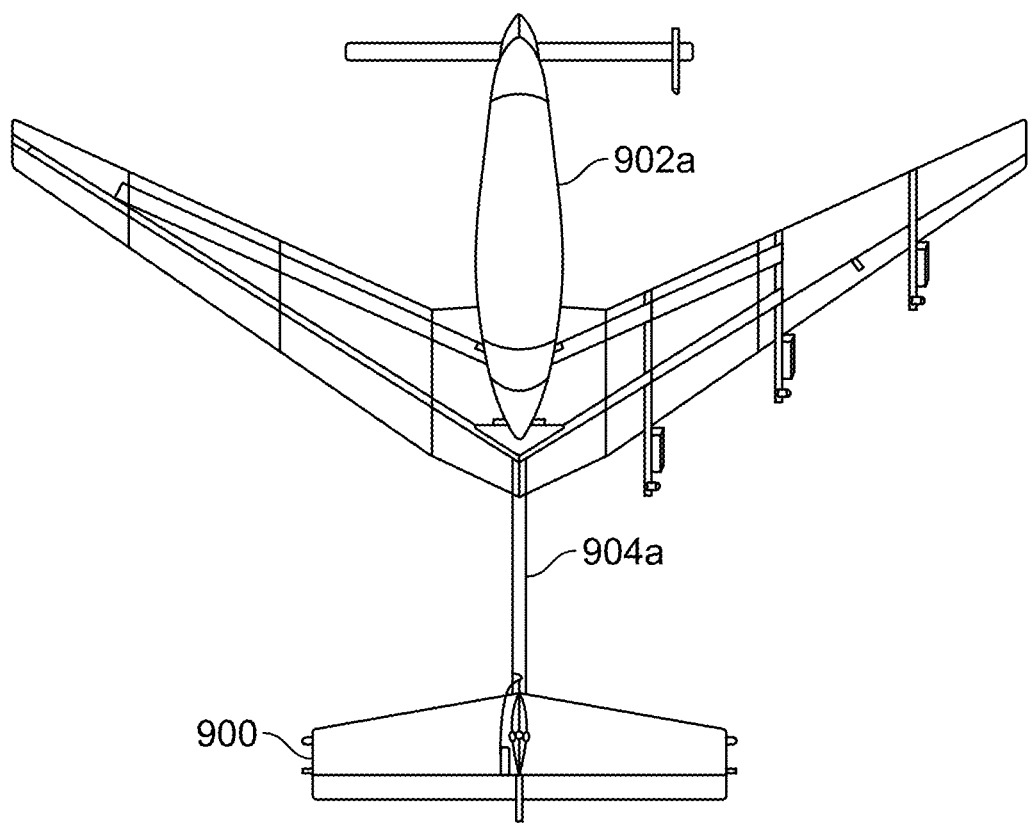
FIG. 9A is a top view diagram illustrating an embodiment of a vehicle with a truncated fuselage and tail.

FIG. 9A is a top view diagram illustrating an embodiment of a vehicle with a truncated fuselage and tail. The embodiment shown here has similarities with the previous vehicle embodiment shown in FIG. 8 and for brevity shared features are not discussed herein. Unlike the previous example, this embodiment has a tail (900). The fuselage (902*a*) is a truncated fuselage so the tail (900) and fuselage (902) are connected using a boom (904*a*).

Figure 9B:
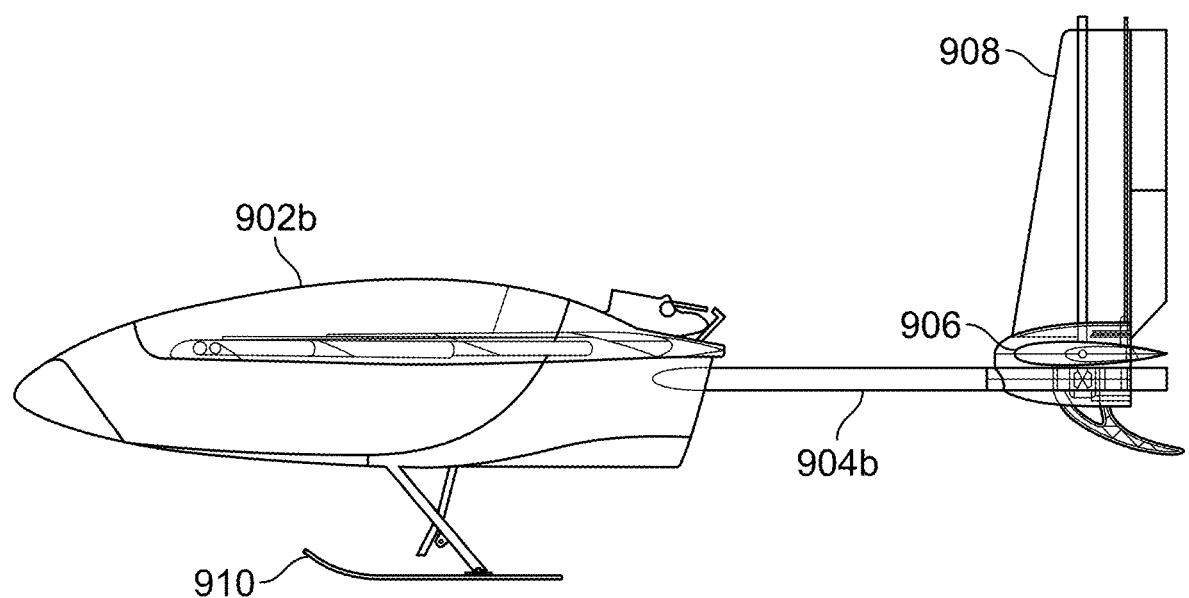
FIG. 9B is a side view diagram illustrating an embodiment of a vehicle with a truncated fuselage and tail.

FIG. 9B is a side view diagram illustrating an embodiment of a vehicle with a truncated fuselage and tail. FIG. 9B continues the example of FIG. 9A. From this view, the truncated fuselage (902*b*) and the boom (904*b*) are shown, as well as other features of the vehicle, including a horizontal control surface (906) and a vertical control surface (908) on the tail and ski-like landing gear (910) are more clearly shown.

In some applications, the truncated fuselage vehicles shown in FIGS. 8-9B may be undesirable (for reasons described in more detail below). The following figures show various embodiments of a STOL vehicle which may be more desirable in such applications.

Figure 10A:
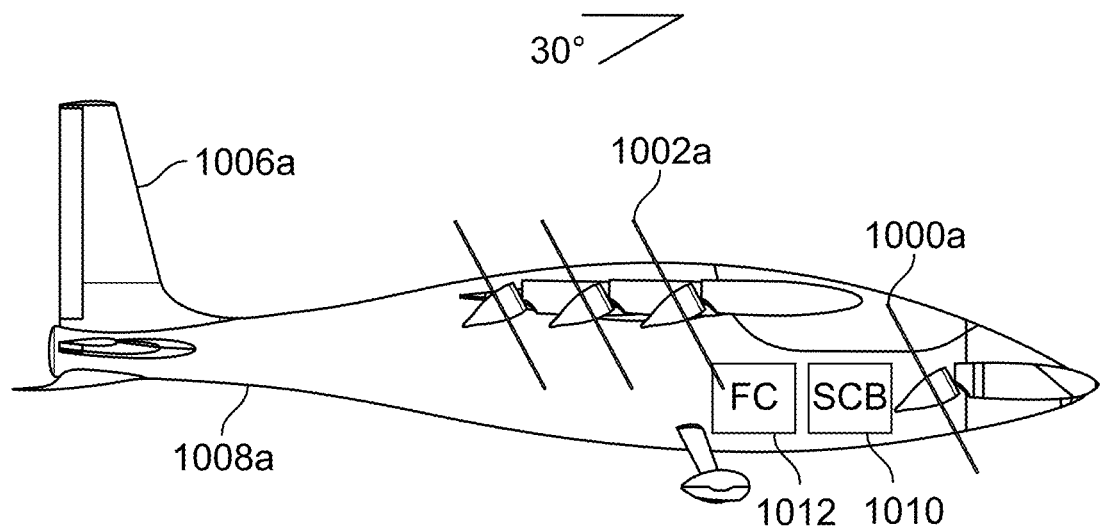
FIG. 10A is a side view diagram illustrating an embodiment of a STOL vehicle with rotors in a 30° position from horizontal.
Figure 10B:
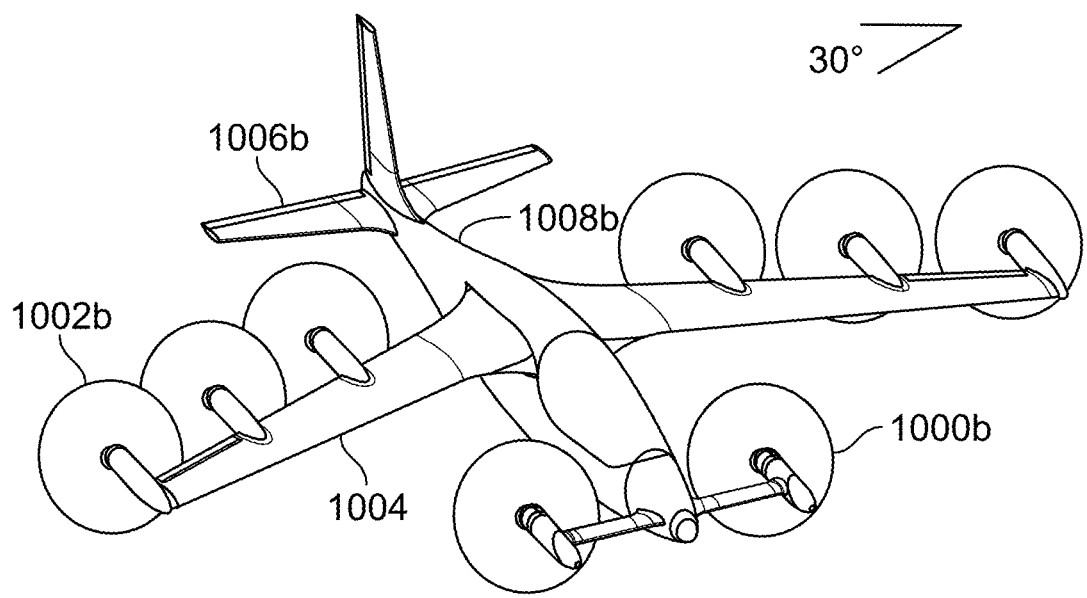
FIG. 10B is a perspective view diagram illustrating an embodiment of a STOL vehicle with rotors in a 30° position from horizontal.

FIG. 10A is a side view diagram illustrating an embodiment of a STOL vehicle with rotors in a 30° position from horizontal. FIG. 10B is a perspective view diagram illustrating an embodiment of a STOL vehicle with rotors in a 30° position from horizontal. In the example shown here, the canard rotors (1000a and 1000b) and the main wing rotors (1002a and 1002b) are in a 30° position from the horizontal, cruise position.

In some embodiments, the rotors (1000a, 1000b, 1002a, and 1002b) do not tilt and are fixed in the position shown here (i.e., 30°). Alternatively, in some other embodiments, the rotors are able to tilt between a horizontal, cruise position (i.e., 0°) and the position shown here (i.e., 30°). In either case, the vehicle is not be configured for vertical takeoffs and landings but instead uses a (short) runway for short take off and landings (e.g., 200 ft.). In some applications, there is space for a short runway and the (cruise) range extension offered by the STOL vehicle is attractive. In some applications, there is runway space but not 200 ft. of runway space. Using a tilt angle that is lower than 30° reduces the runway length (but will also affect the range of the vehicle and the maximum velocity).

A benefit to the rotors being in the position shown in FIGS. 10A-10B is that it increases the dynamic pressure over the main wing (1004) from the main wing rotors (1002a and 1002b), producing higher lift coefficients (e.g., compared to a comparable VTOL vehicle such as that shown in FIGS. 1A and 1B). In other words, takeoff and landings for the STOL vehicle are more efficient compared to a comparable VTOL vehicle at takeoff and landing so less power is needed from the drivetrain. In terms of thrust-to-weight ratio, the exemplary STOL vehicles needs about half of what a comparable VTOL vehicle needs to take off or land.

Another benefit is that because of the reduced power demands on the powertrain during takeoff and landing, a smaller and lighter powertrain may be used for the exemplary STOL vehicle compared to a comparable VTOL vehicle. This weight saving may be used to carry more payload or more batteries (e.g., to extend the range while keeping the total weight substantially the same). For example, if extra batteries are added to the STOL vehicle, a cruise range increase of ~25% may be realized.

Additional weight savings may be realized if the rotors or propellers are fixed. With fixed rotors the tilt mechanism can be removed. If this additional weight saving is used for (still) more batteries, the range may increase ~30%-35% over the comparable VTOL vehicle.

In some embodiments, the rotors are downsized (e.g., smaller blades as well as smaller motors and power electronics for the motors) relative to a comparable VTOL vehicle (e.g., FIGS. 1A and 1B) due to the reduced power demands associated with short takeoffs and landings compared to vertical takeoffs and landings. This may be attractive because in addition to weight savings, better packaging can be achieved due to the smaller components which reduces drag and also reduces the space needed for hangaring (e.g., since the overall vehicle width is narrower).

In some embodiments, the (range of) blade pitch angle(s) for a STOL rotor is adjusted (e.g., compared to a comparable VTOL vehicle) due to the more restrictive (range of) pitch angle(s). For example, with a fixed rotor, an optimal blade pitch angle for that fixed tilt position may be selected. Or, if the rotor is a tilt rotor, the range of blade pitch angles may be reduced and/or adjusted as a result of the reduced range of motion tilt positions (e.g., with a maximum tilt position in the range of 20°-40°, or 30°-60°).

Unlike the truncated fuselage vehicles shown in FIGS. 8-9B, the STOL vehicle shown in FIGS. 10A-10B has a full length fuselage (1008a and 1008b) that is directly coupled to the tail (1006a and 1006b), as opposed to a truncated fuselage that is coupled to the tail via a boom. Another way of describing this is that a surface of the tail (directly) meets or contacts a surface of the fuselage so that there is no surface discontinuity (e.g., due to a boom). This surface continuity may be desirable for aerodynamic reasons. As a result of the different configurations, there may be different ranges of tilt angles that are appropriate for the different configurations, as well different methods of flying, performance characteristics, and/or associated benefits. In some applications, the STOL vehicle shown in FIGS. 10A-10B is more attractive than the truncated fuselage vehicles shown in FIGS. 8-9B. For example, due to the passive stability of the exemplary STOL vehicle, it may be more attractive for use in manned applications since the control system need not be certified to the same level of redundancy and/or robustness. In the event of a failure of the system, the STOL vehicle is still capable of being controlled by a pilot without an automatic control system during cruise the vehicle can be landed via a conventional landing.

The following figures show STOL vehicles with rotors at various tilt positions and/or angles and runway lengths, ranges, and maximum velocities associated with those embodiments.

Figure 11:
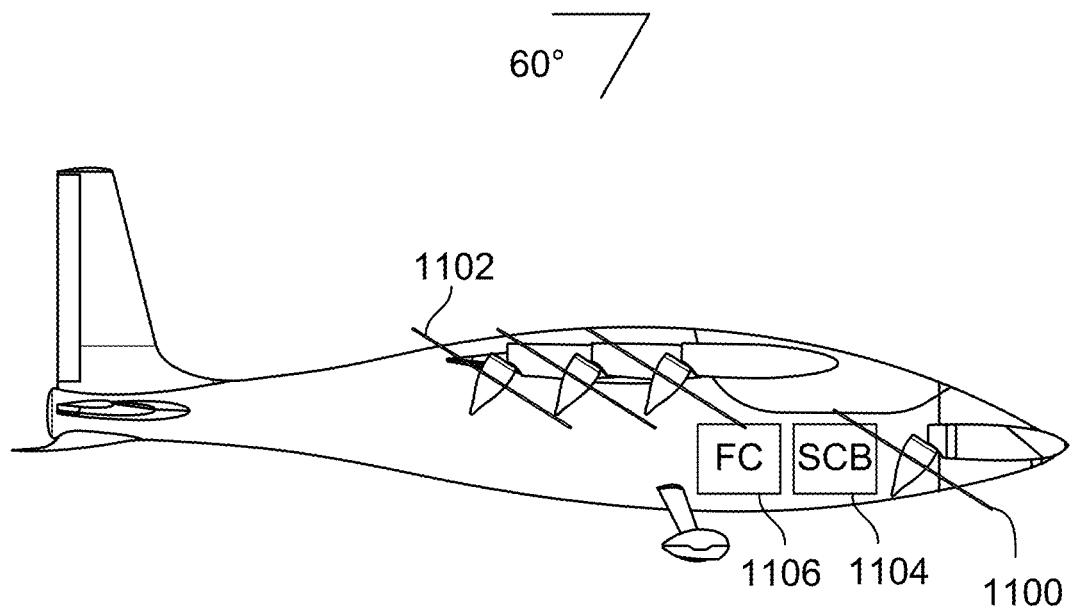
FIG. 11 is a diagram illustrating a side view of a STOL vehicle with rotors in a 60° position from horizontal.

FIG. 11 is a diagram illustrating a side view of a STOL vehicle with rotors in a 60° position from horizontal. In this example, the canard rotors (1100) and the main wing rotors (1102) are in a 60° position from the horizontal, cruise position. In various embodiments, the rotors are tilt rotors or fixed rotors.

Figure 12:
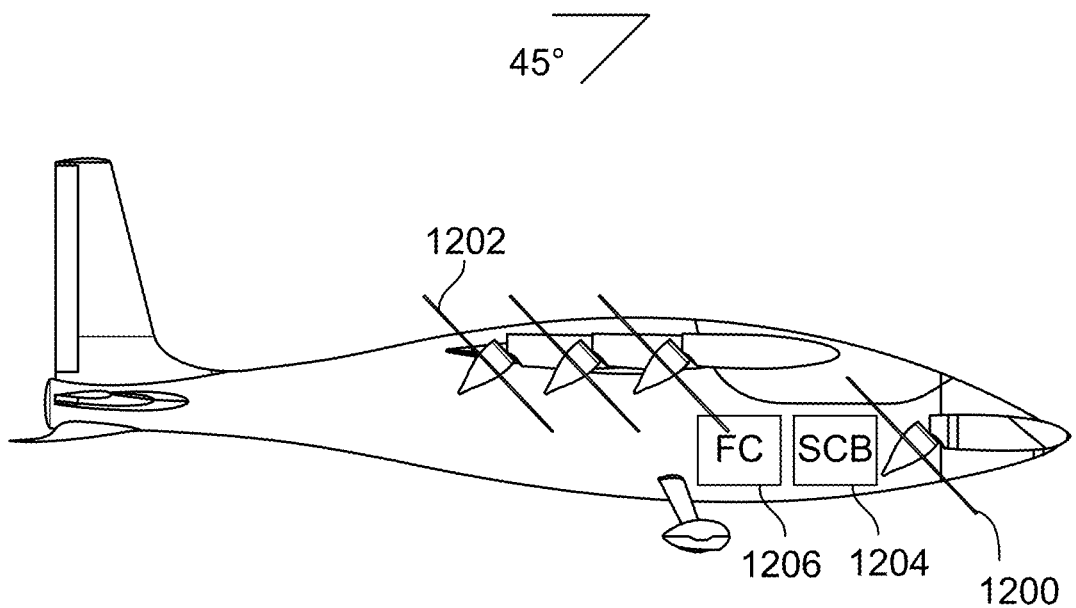
FIG. 12 is a diagram illustrating a side view of a STOL vehicle with rotors in a 60° position from horizontal.

FIG. 12 is a diagram illustrating a side view of a STOL vehicle with rotors in a 60° position from horizontal. In this example, the canard rotors (1200) and the main wing rotors (1202) are in a 45° position from the horizontal, cruise position. As described above, in various embodiments the rotors are tilt rotors or fixed rotors.

TABLE 1

Example metrics associated with different (maximum) tilt angles corresponding to FIGS. 10A-12. The range values assume a weight savings in the STOL's drivetrain which permit the STOL vehicle to carry more batteries compared to a comparable VTOL vehicle

| (Max) Tilt Angle | Runway Length | Range* | Max Velocity |
|---|---|---|---|
| 30° | Longer runway than VTOL | Longer range than VTOL | Slower max velocity than VTOL |
| | Longer runway than 45° (max) tilt angle | Longer range than 45° (max) tilt angle | Slower max velocity than 45° (max) tilt angle |
| 45° | Longer runway than VTOL | Longer range than VTOL | Slower max velocity than VTOL |
| | Shorter runway than 30° (max) tilt angle | Shorter range than 30° (max) tilt angle | Faster max velocity than 30° (max) tilt angle |

Table 1 illustrates various (e.g., performance) metrics and/or characteristics of the different (maximum) tilt angles shown in FIGS. 10A-12. Naturally, depending upon the application and/or performance metrics of interest, different (maximum) tilt angles are more attractive than others.

In some embodiments, a common or shared code base for the flight computer is used for the various embodiments described above, including fixed rotors and tilt rotors. For example, for safety and/or certification reasons, it may be desirable to maintain a single collection of code for the flight computer. In one example, there is a (e.g., global) parameter or setting associated with the tilt range. For example, for a fixed rotor at 30° the range is [30°, 30° ] but for a tilt rotor with a maximum tilt angle of 60° the range is [0°, 60° ] (e.g., where 0° is the rotor in the cruise (i.e., forward flight) position). This global parameter is propagated throughout and is used by the flight computer (code) to determine (as an example) the rotor thrust control signals to achieve the desired forces and moments given the permitted range of tilt angles. For example, the permitted range would first be used to limit the actuator authority database and then used to determine which (flight) modes (e.g., hover or STOL takeoff and landing), are permitted. The controller can then use the subset of modes available and actuator authority maps or database to determine how best to allocate usage of actuators throughout the flight (e.g., during thrust allocation which generates motor control signals for the motor controllers). Using the same code base may also make it easier to support a fleet of configurable vehicles that can be reconfigured as desired (described in more detail below).

In some embodiments, it may be desirable to have a fleet of configurable vehicles that can be reconfigured as desired (e.g., depending upon current demand and/or flight applications). In some embodiments, this permits a vehicle to be configured for VTOL (e.g., per FIGS. 1A and 1B) or STOL (e.g., per FIGS. 10A-12) as desired. In some embodiments, to change the (maximum) tilt angle, the rotor may include physical devices that limit the (maximum) tilt angle, such as hard stops of different sizes. In some embodiments, the STOL vs. VTOL configuration is done purely via software limits (e.g., setting a parameter associated with a range of permitted tilt angles).

In some embodiments, the vehicle includes modular and/or swappable parts so that parts that are better suited for VTOL vs. STOL or fixed rotor vs. tilt rotor can be supported. For example, the brackets supporting the tilt mechanism and motor may not be bonded to the carbon structure but bolted to a support frame which in turn is bonded to the structure. This would allow a tilt hinge mounted rotor to be swapped out for a fixed angle rotor relatively quickly. While the weight associated with such a setup would be greater than configurations which cannot be changed easily, the ability to use a common fleet might offset this in some cases.

Various embodiments of STOL vehicles have been described herein but these examples are merely exemplary and are not intended to be limiting. In various embodiments, a vehicle includes a tandem wing or a single wing arrangement designed for STOL operations that may be used for long range applications with vehicle size ranging from a single person vehicle size to sizes comparable to regional aircraft. In some such embodiments, the tilt would be restricted to 45°-60° from horizontal (i.e., the forward flight configuration). Although runways would be needed to land, they could be drastically shortened (e.g., as short as 100-200 feet). This permits flights to or from smaller airports or even larger heliports that have adequate available space. In some applications, such vehicles are used for (e.g., dedicated) flights to and from entities (e.g., universities or businesses) having adequately large campuses. By restricting the tilt to (as an example) 45°-60° creates a flap effect allowing the main wing to generate higher lift without stalling due to induced flow from the propellers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A vehicle, comprising:
    a tilt rotor that is aft of a fixed wing and that is attached to the fixed wing via a pylon; and
    a flight computer configured to instruct the tilt rotor to produce a maximum downward angle including by:
        updating an actuator authority database associated with the flight computer to reflect the maximum downward angle; and
        generating a rotor control signal for the tilt rotor using the updated actuator authority database that reflects the maximum downward angle, wherein the maximum downward angle is adjustable.

2. The vehicle recited in claim 1, wherein the fixed wing includes a forward-swept and tapered wing.

3. The vehicle recited in claim 1, wherein the tilt rotor includes a plurality of hard stops corresponding to different maximum downward angles.

4. The vehicle recited in claim 1, wherein the tilt rotor is capable of rotating between a cruise position and the maximum downward angle.

5. The vehicle recited in claim 1, wherein the maximum downward angle is determined based at least in part on a length of a runway.

6. The vehicle recited in claim 1, wherein the maximum downward angle is determined based at least in part on a desired range for the vehicle.

7. The vehicle recited in claim 1, wherein the flight computer is configured to update a set of permitted flight modes associated with the flight computer to reflect the maximum downward angle.

8. The vehicle recited in claim 1, wherein:
    the maximum downward angle is at 90°; and
    the flight computer is configured to update a set of permitted flight modes associated with the flight computer to include a hover flight mode.

9. A method, comprising:
    providing a tilt rotor that is aft of a fixed wing and that is attached to the fixed wing via a pylon; and
    providing a flight computer, wherein the flight computer is configured to instruct the tilt rotor to produce a maximum downward angle including by:
        updating an actuator authority database associated with the flight computer to reflect the maximum downward angle; and
        generating a rotor control signal for the tilt rotor using the updated actuator authority database that reflects the maximum downward angle, wherein the maximum downward angle is adjustable.

10. The method recited in claim 9, wherein the fixed wing includes a forward-swept and tapered wing.

11. The method recited in claim 9, wherein the tilt rotor includes a plurality of hard stops corresponding to different maximum downward angles.

12. The method recited in claim 9, wherein the tilt rotor is capable of rotating between a cruise position and the maximum downward angle.

13. The method recited in claim 9, wherein the maximum downward angle is determined based at least in part on a length of a runway.

14. The method recited in claim 9, wherein the maximum downward angle is determined based at least in part on a desired range for a vehicle in which the tilt rotor is provided.

15. The method recited in claim 9, wherein the flight computer is configured to update a set of permitted flight modes associated with the flight computer to reflect the maximum downward angle.

16. The method recited in claim 9, wherein:
   the maximum downward angle is at 90°; and
   the flight computer is configured to update a set of permitted flight modes associated with the flight computer to include a hover flight mode.

* * * * *